July 19, 1966    R. W. JOHNSON ETAL    3,261,152
NUT PICK-UP DEVICE
Filed Aug. 19, 1964
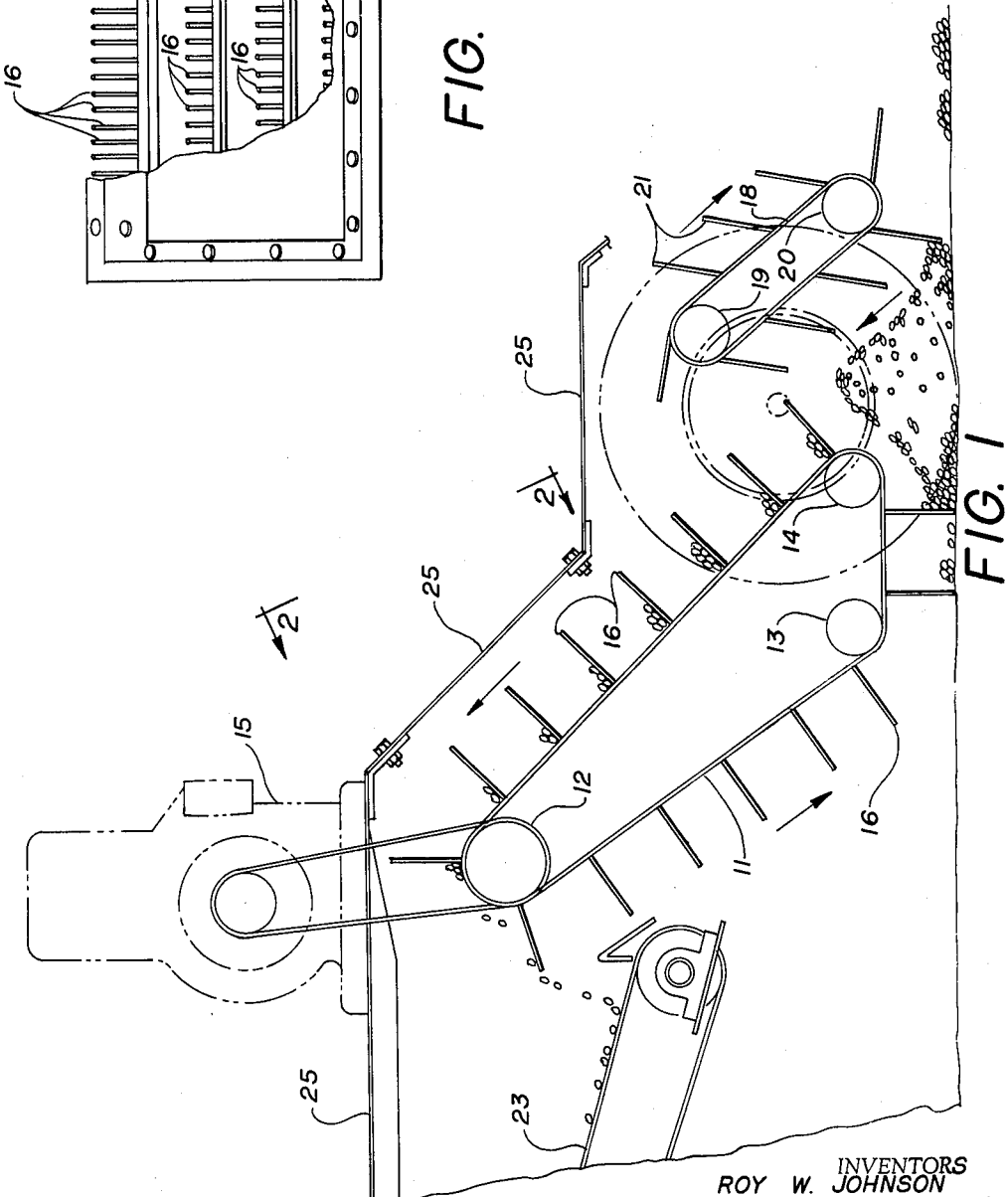
INVENTORS
ROY W. JOHNSON
BERNELL H. JOHNSON
BY
Townsend and Townsend
ATTORNEYS United States Patent Office 3,261,152
Patented July 19, 1966

3,261,152
NUT PICK-UP DEVICE
Roy W. Johnson and Bernell H. Johnson, Woodland, Calif., assignors, by mesne assignments, to Johnson Farm Machinery Co., Inc., Woodland, Calif., a corporation of California
Filed Aug. 19, 1964, Ser. No. 390,652
4 Claims. (Cl. 56—328)

This invention relates to nut harvesting equipment and particularly to equipment for raking up and collecting nuts.

An object of the present invention is to provide increased efficiency in raking devices for raking up nuts that are lying on the ground. While the present invention is best suited to raking up nuts, it may also be used for raking up certain fruits, as for example, prunes. The raking action in the present invention is provided by a conveyor on which are mounted teeth or rubber fingers set in rows. The conveyor is mounted so that in part at least it travels substantially parallel to the ground with the teeth or fingers mounted on the conveyor raking the ground. The rows of teeth or fingers are set apart at a distance so that at least two of the rows are raking the ground simultaneously thereby assuring that nuts or fruit missed by one row will in all likelihood be raked up by a succeeding row.

Another object of the present invention is to provide a device which will force the nuts which are raked by the conveyor to pile up at a point where the conveyor turns in an upward direction around a pulley so that the nuts may be swept upwardly on the teeth mounted on the first conveyor. In the present invention a second conveyor, also having teeth or fingers mounted thereon, is mounted on pulleys forwardly of the first conveyor. The second conveyor rotates in the opposite direction of the first conveyor and the teeth or fingers pass close enough to the ground so that nuts thrown forward by the raking action of the first conveyor are stopped by the teeth on the second conveyor, and thereby forced into a pile between the two conveyors.

As the first conveyor travels around the pulley adjacent the forming pile of nuts, it is directed in a plane such that it may, at least in part, support and carry objects thereon. The teeth or fingers of this conveyor are spaced closely enough together so that nuts cannot pass therebetween. By so directing the conveyor and by so spacing the teeth or fingers thereon, the conveyor and teeth, as they pass upwardly around the pulley adjacent the pile of nuts, scoop up the nuts and carry them away from the pile, thereby providing an improved device for collecting the nuts after they have been raked.

Other objects and advantages of the present invention will become apparent upon reading the following specifications and referring to the accompanying drawings.

In the drawings:

FIG. 1 is a partial side view of a nut harvester frame with a near side cover plate and the wheel broken away showing the apparatus of the present invention.

FIG. 2 is a view taken from line 2—2 of FIG. 1 showing the teeth and conveyor arrangement partially exposed under a cut-away of a cover plate.

The device of the present invention employs in a suitable harvester frame depicted generally in FIG. 1, a conveyor or endless belt 11 which preferably passes over three pulleys 12, 13 and 14. The conveyor is driven by any one of a number of standard devices. In the preferred embodiment the top pulley 12 is a driver pulley which may be driven by a motor 15 or by the power take-off of a tractor employed to pull the harvester. Preferably the two pulleys 13 and 14 are mounted on the harvester frame in such a manner that their respective axes lie in substantially the same horizontal plane. Pulleys 13 and 14 are the lowest pulleys mounted in the frame around which conveyor 11 is driven so that conveyor 11 while traveling between pulleys 13 and 14 is substantially parallel to the ground. Conveyor 11 is preferably of a width suitable for harvesting nuts lying in wind rows.

Preferably mounted on conveyor 11 are teeth 16. Preferably teeth 16 are made of metal and are flexibly mounted on conveyor 11. However, instead of metal teeth, there may be employed solid rubber teeth or even a continuous rubber ridge that is slit at appropriate intervals thus forming flexible paddles or flaps. Such rubber teeth or flaps may prove superior to metal teeth 16 for use over ground that is not smooth but clodded. Teeth 16 are of such a length that when conveyor 11 passes between pulleys 13 and 14, teeth 16 rake the ground. Teeth 16 are mounted in rows which are spaced apart at a distance such that at least two of the rows of teeth 16 are raking the ground simultaneously. By having at least two rows of teeth raking the ground at the same time, the present invention insures that any nuts missed by the first row of teeth will, in all probability, be raked up by succeeding rows of teeth.

Because it is contemplated that conveyor 11 will be traveling substantially parallel to the ground, teeth 16 will rake the ground evenly. Another embodiment of the present invention might provide for a deeper raking action under pulley 13 than under pulley 14 to give a more thorough raking capability to the "follow up" rows. This could be accomplished by mounting pulley 13 to the harvester frame so that it will be closer to the ground than pulley 14.

Teeth 16 are spaced apart from adjacent teeth 16 in the same row at a distance to prevent the passage of nuts between adjacent teeth 16.

The device of the present invention further employs a second conveyor 18 which preferably passes over two pulleys 19 and 20. Either pulley 19 or 20 may be the driver pulley. In the preferred embodiment, pulleys 19 and 20 are positioned so that conveyor 18 will travel in two inclined planes. In this embodiment the top pulley 19 is preferably the driver pulley and it may in turn be driven by motor 15 or by the power take-off of a tractor employed to tow the harvester. Mounted on conveyor 18 are teeth 21 preferably mounted in rows as are the teeth 16 mounted on conveyor 11. Teeth 21 are preferably mounted at such an angle in relation to conveyor 18 that when traveling in an upward direction from lower pulley 20 to upper pulley 19 they are pointed in a direction perpendicular or approximately perpendicular to the ground below. Teeth 21 are of such a length that when conveyor 18 passes over lower pulley 20, teeth 21 pass closely enough to the ground to prevent the passage of nuts between the ground and teeth 21. Conveyor 18 is positioned with respect to conveyor 11 so that the tips of respective teeth 16 and 21 pass closely together without interdigitating.

Conveyor 11 and conveyor 18 each are driven over their respective pulleys in such a direction that the surface of conveyor 11 nearest conveyor 18 and the surface of conveyor 18 nearest conveyor 11 both move in an upward direction. Conveyor 11 and conveyor 18 are also preferably positioned so that their mutually opposing surfaces travel upwardly in approximately parallel planes.

When the nut harvester is drawn over the nuts to be harvested, teeth 16 mounted on conveyor 11 rake and throw the nuts in the dircetion of conveyor 18. Teeth 21 mounted on conveyor 18 form, in effect, a barrier which stops the nuts thrown by teeth 16 and causes them to form into a moving pile on the ground area between the respective lower pulleys 14 and 20.

Teeth 16 in passing over pulley 14 gather up and carry the nuts upward and back onto conveyor 11 as it preferably travels upward toward pulley 12. As the pile of nuts on the ground increases in size more and more nuts are gathered by teeth 16 onto conveyor 11. The nuts are carried to pulley 12 and then forced by gravity to fall from conveyor 11 as it travels around pulley 12. The nuts at this point may fall directly into a trailer or other loading device, or, as shown in the accompanying drawing, onto another endless belt or conveyor as shown at 23 for further processing such as cleaning by means of an air blower. Preferably conveyor 23 is not solid but, rather, in the form of a screen so that dirt and other objects raked up with the nuts will be sifted and separated from the nuts.

The harvesting apparatus in which the device of the present invention is mounted may be on wheels as shown at 24 or may be connected to a tractor by bars. Preferably the device of the present invention is protected by cover members 25.

A number of modifications may be made without departing from the spirit of the invention and we do not intend to limit ourselves except as set forth in the claims which follow.

What we claim is:

1. Apparatus for harvesting nuts laying on the ground comprising: a frame movable over the ground, an endless conveyor having a pair of vertically spaced extremities and being mounted on said frame for movement with respect thereto, a plurality of rows of teeth mounted on and projecting laterally from said conveyor for movement therewith, the outer ends of the teeth of each row being normally adjacent to the ground when the row moves through a region adjacent to said lowermost extremity to effect raking of nuts forwardly with respect to the direction of travel of said frame and into a pile substantially in advance of said lowermost extremity, said teeth of each row being of a length sufficient to penetrate said pile of nuts as the teeth move upwardly and being in sufficiently close proximity to each other to permit a number of the nuts of the pile in the path of upward movement of the teeth to be elevated therefrom and to be carried upwardly with the conveyor after the teeth have successively penetrated the pile and moved out of the latter, means mounted on said frame and disposed in advance of said conveyor for cooperating with said teeth to facilitate the formation of the forward portion of said pile and to maintain the latter whereby said teeth may continue to gather the nuts by elevating the same after said pile has been formed, and means on the frame for moving said conveyor.

2. Apparatus for harvesting nuts as set forth in claim 1, wherein said conveyor has a horizontal, lowermost stretch, each pair of adjacent rows of said teeth being sufficiently close together to permit two rows to be simultaneously on said horizontal stretch during movement of the conveyor relative to the frame, said cooperating means including a second, endless conveyor having a plurality of spaced rows of teeth thereon and movable to cause said teeth thereof to block the travel of nuts forwardly of said pile.

3. Apparatus for harvesting nuts as set forth in claim 1, wherein said cooperating means includes a second, endless, movable conveyor having a pair of vertically spaced extremities and provided with a plurality of spaced rows of teeth secured thereto and projecting transversely therefrom, the outer ends of said teeth of said second conveyor being sufficiently close together and sufficiently close to the ground when the teeth are adjacent to the lowermost extremity of the second conveyor to substantially prevent the passage of nuts forwardly from said pile of nuts between said conveyor.

4. Apparatus for harvesting nuts as set forth in claim 1, wherein said cooperating means includes a second, endless conveyor having a plurality of spaced rows of teeth thereon and being movable to cause said teeth thereof to substantially block the travel of nuts forwardly of said pile, said second conveyor having a rearmost, upwardly and rearwardly inclined stretch, said teeth of said second conveyor being angularly disposed with respect thereto and being substantially upright when the teeth are on said rearmost stretch, whereby the outer ends of the teeth on said rearmost stretch may define the front face of said pile of nuts.

References Cited by the Examiner

UNITED STATES PATENTS

| | | | |
|---|---|---|---|
| 1,921,651 | 8/1933 | Behling | 56—328 |
| 2,679,133 | 5/1954 | Soderholm | 56—328 |
| 2,780,904 | 2/1957 | Bowie et al. | 56—328 |
| 2,901,879 | 9/1959 | Jones | 56—328 |
| 3,148,493 | 9/1964 | Tubbs | 56—328 |

ANTONIO F. GUIDA, *Acting Primary Examiner.*

RUSSELL R. KINSEY, *Examiner.*

M. C. PAYDEN, *Assistant Examiner.*